Figure 4:

United States Patent [19]

Van Daele

[11] Patent Number: 4,737,859
[45] Date of Patent: Apr. 12, 1988

[54] METHOD AND APPARATUS FOR PRODUCING A COMPOSITE RECORD FROM VISUALLY DISTINGUISHABLE IMAGES

[75] Inventor: Jean A. Van Daele, Bonheiden, Belgium

[73] Assignee: Agfa-Gevaert, N.V., Mortsel, Belgium

[21] Appl. No.: 19,112

[22] Filed: Feb. 26, 1987

[30] Foreign Application Priority Data

Mar. 4, 1986 [EP] European Pat. Off. ... EP86200338.1

[51] Int. Cl.$^4$ .......................... H04N 1/46; H04N 1/40
[52] U.S. Cl. .................................. 358/296; 358/298; 358/283; 358/280
[58] Field of Search ............... 358/296, 298, 283, 284, 358/286, 261, 75, 903, 280; 283/901, 72, 93

[56] References Cited

U.S. PATENT DOCUMENTS 4,626,902 12/1986 Yamada .............................. 358/283

Primary Examiner—E. A. Goldberg
Assistant Examiner—Linda M. Peco
Attorney, Agent, or Firm—A. W. Breiner

[57] ABSTRACT

A method and an apparatus are disclosed for producing in a bi-level recording device a composite record from visually distinguishable images by means of a logical EXOR operation calculated on the binary representations of either of said images.

8 Claims, 2 Drawing Sheets

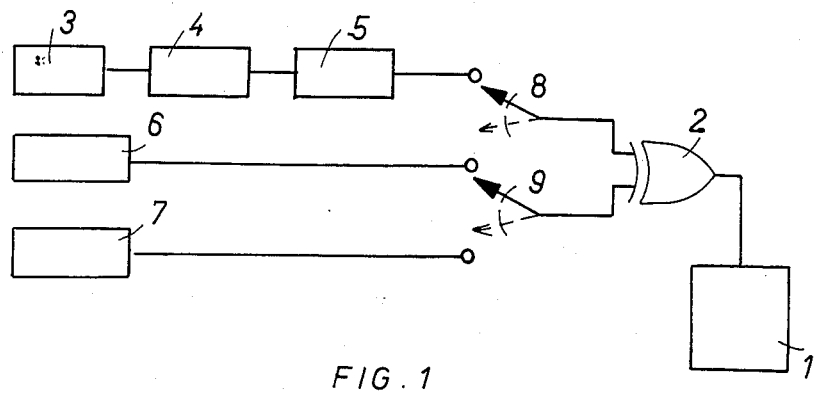
FIG. 1
| LW | IM | OUT |
|----|----|-----|
| 1  | 1  | 0   |
| 1  | 0  | 1   |
| 1  | 1  | 1   |
| 0  | 0  | 0   |
FIG. 2
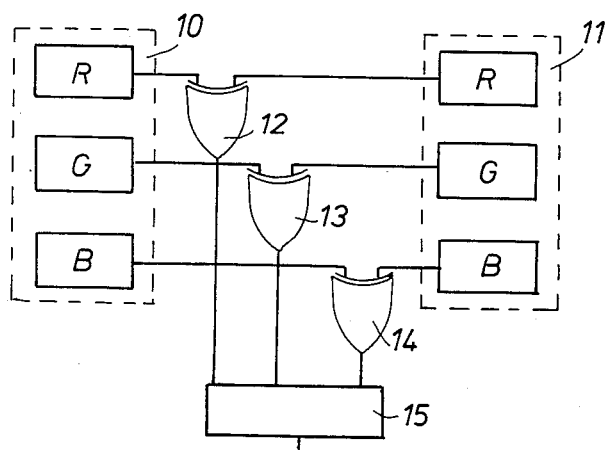
FIG. 3

METHOD AND APPARATUS FOR PRODUCING A COMPOSITE RECORD FROM VISUALLY DISTINGUISHABLE IMAGES

The present invention relates to a method and an apparatus for producing by means of a bi-level recording device, a composite half-tone record in which half-tone images of different subjects remains visually distinguishable.

The invention is particularly intended for use in the production of documents which are difficult to counterfeit and is very suitable for use in the production of personalised documents, e.g. identity cards, driving licences, and bank cards.

Personal identification documents are often made by entering personal data on a bland identification card and by providing the document with a photograph of the owner. Additional data such as a signature can be added for further confirmation of authenticity.

It is also known to produce identification and other documents combining photographic images of different subjects, e.g. a portrait and personal data on a common image carrying sheet (U.S. Pat. No. 4,011,570 and EP-A-0 147 488).

The U.S. Pat. No. 4,011,570 describes a photographic camera for simultaneously producing photographic images of different subjects on a common silver halide photographic material, e.g. a negative material suitable for use in a silver complex diffusion transfer (DTR process).

EP-A-0 147 488 described a method wherein a composite record combining screened images of a continuous tone original and of a graphic data pattern original are simultaneously produced on a photographic material. Different screens are used for the production of the different images. The continuous tone image is composed of dots of different size. The graphic data original, e.g. a typewritten text, a signature or finger prints, is composed of dots of substantially the same size.

Although identification documents produced photographically as above described are intended to safeguard against the use of forged documents, the production of the documents does not require sophisticated apparatus and the production of counterfeits is not very difficult.

It is an object of the present invention to provide a method and an apparatus for producing records which are more difficult to counterfeit.

According to the present invention, there is provided a method of producing by means of a bi-level recording device a composite record from visually distinguishable images characterised in that said bi-level recording device is activated in dependence on the result of a logical EXOR operation on the binary representations of said images that are at least partly superimposed thereby to produce a composite half-tone record in which the images remain distinguishable.

The invention is primarily intended for use in the production of documentary records and therefore in preferred embodiments the bi-level recording device directly creates a visible or a latent developable image on a recording material. It is however within the scope of the invention for the bi-level recording device to be a visual display unit by which the record is produced as a visual display and the record can be simultaneously or subsequently reproduced in documentary form if so required.

A particularly important use for the invention is in the production of a composite document from a continuous tone image or from a half-tone image of a continuous tone subect, in particular a portrait, and an image of a uniform tone subject, e.g. textual matter such as a name, or finger prints. Accordingly in preferred embodiments of the invention, the record produced by means of the bi-level recording device comprises a half-tone image of a continuous tone subject and a visually distinct half-tone image of a uniform tone subject, one of such images being superimposed on or partly overlapping the other. For convenience the term "line-work" is hereafter used as an alternative term to denote textual matter or any other uniform tone subject.

By the EXOR logic operation on the binary representations of the images the composite document comprises, a pixel of the composite record is represented by a zero when in said pixel the images are superimposed and is represented by a "one" when in said pixel only one of the images is exclusively present. In accordance with said binary representation, a recording device such as a bi-level printing device can be activated.

The binary signal representations of the subjects to be imaged in the composite record can be generated by means of a scanner or a video cameras. A character generator can be used for generating signals representative of line-work information such as textual matter. The subjects to be imaged can be converted to electrical signals in either digital or analogue form. In the latter case the signal is fed to an analogue-to-digital converter before being applied to a logical EXOR gate.

In some methods according to the invention the print engine of a binary printing device such as an LED-printer or a laser-printer or an inkjet printer is activated in dependence on the results of the logical EXOR operations.

In other applications of the method the results of the EXOR operations are used for controlling the exposure of a light-sensitive material e.g. in a phototypesetter.

The invention includes a method wherein the recording device produces images from colour separation records of the images to be recorded and the EXOR operation is performed on at least one bit map of a colour separation record pertaining to each of the images to be recorded.

The invention includes apparatus for producing a composite record by a method according to the invention as hereinbefore defined. Apparatus according to the invention has the features specified in claim 5 hereof.

Certain embodiments of the invention, selected by way of example, will now be described with reference to the accompanying drawings, in which:

FIG. 1 shows a schematical representation of an embodiment of a device for exerting the method according to the present invention, FIG. 2 is a look-up table representing the output of an EXOR logical gate, FIG. 3 shows an embodiment of a device for producing a coloured document by means of the method of the present invention, and FIG. 4 is an example of a composite document comprising a half-tone image and line-work that are partly superimposed. The composite document is produced according to the method of the present invention.

The print engine 1 of a binary document printing apparatus such as a LASER-printer, a LED-printer, or an inkjet printer is activated on command of a signal that is provided at the output of a logical EXOR gate 2. To one input terminal of said EXOR gate the binary representation of a half-tone or a continuous tone image is applied. Into the other input terminal the binary representation of line-work is fed.

An analogue video representation of a continuous tone or a half-tone image can be obtained by means of a video camera 3. The signal is digitized in an analogue-to-digital converter 4 and is stored in an image storage device 5 before being fed to the EXOR logical gate.

An electrical representation of a continuous tone image, a half-tone image or line-work can be obtained by means of a document scanning apparatus 6.

When the binary representation of the half-tone or continuous tone image and of the line-work are both provided by the same document scanning apparatus, it will be clear to the person skilled in the art that the representations of the images have to be generated in sequence. Hence one representation is to be stored while another is generated. An additional device is to be provided for selecting either input terminal 8 or input terminal 9. Nor the storage device, nor the input selecting device is shown in this figure.

The binary representation of characters to be recorded can furthermore be provided by means of character generator 7.

The output of the devices 5 or 6 is applied to the half-tone input terminal 8 of the EXOR logical gate 2 whereas the output of device 6 or 7 is applied to the line-work input terminal 9 of the logical EXOR gate 2.

FIG. 2 is a truth table representing the output of an EXOR logical gate.

In this figure column LW represents the binary representation of line-work whereas IM represents the binary representation of a half-tone or a continuous tone image. In the columns LW and IM a "one" gives an indication on the presence of line-work, a pixel of a continuous tone image or a pixel of a half-tone image whereas absense of either kind of information is denoted by a "zero".

In accordance with the values of column OUT, the output of the EXOR logical gate will generate a print decision for the print engine in accordance with a "one", whereas in accordance with a "zero" the print engine will be disabled. The results of the EXOR function illustrate that the recording device will be activated whenever in a pixel binary information or half-tone, or continuous tone information is exclusively present.

FIG. 3 shows a particular embodiment of a device for producing a document from a coloured continuous tone or half-tone image and coloured line-work.

The halftone or continuous tone images and the line-work are separated into colour components (R, G, B). Bitmaps of the colour components corresponding with the half-tone or continuous tone image 10 and with the line-work 11, are applied to three EXOR logical gates 12, 13, and 14. At the output of these EXOR logical gates three binary signals are obtained. Each of these signals is used for controlling the recording of a colour component of the combinatory document in document recording device 15.

In the present embodiment EXOR operations are exerted on bit maps of corresponding colour components of the images. It is also within the scope of the present invention to perform less than three EXOR operations or to perform these EXOR operations on other combinations of bit maps.

FIG. 4 represents a document wherein a portrait and additional textual matter are combined in accordance with the method of the present invention.

The document is produced in a bi-level printing device such as an LED-printer. The print-engine of said printing-device is activated by means of signals that are generated in dependence on the result of a logical EXOR operation performed on the binary representation of said portrait and said textual information in each pixel. The binary representation of the portrait is obtained through digitization of a video signal whereas the binary representation of the characters is generated by a character generator. Presence of either kind of information is denoted by a logical "1" whereas absence is represented by a logical "0".

In the following the generation of several parts of the document by means of the method of the present invention is illustrated.

A pixel of the composite image wherein line-work information is exclusively present can f. i. be found in the letter "V" of the printed name. To the IM input terminal of EXOR gate a zero has been applied, whereas the LW terminal has been fed with a one. According to the truth table of the EXOR a control signal has been generated for driving the print engine in order to print a black dot on the paper.

A pixel out of that part of the image in which half-tone information is exclusively present is f.i. found in the face of the portrait. In such a pixel the EXOR operation has also resulted in activation of the print engine.

In pixels that are part of both kinds of information (line-work and half-tone image) as for example in some pixels of the letter "b" in the name, no print decision is generated.

Absence of line-work and absence of half-tone work has resulted, according to the EXOR logic operation, in no print decision.

I claim:

1. A method of producing by means of bi-level recording device a composite record from visually distinguishable images characterised in that said bi-level recording device is activated in dependence on the result of a logical EXOR operation on the binary representations of said images that are at least partly superimposed thereby to produce a composite half-tone record in which the images remain distinguishable.

2. Method according to claim 1 wherein said images are coloured or colour developable images and wherein said logical EXOR operation is calculated on at least one bit map of a colour separation record of each of said images so as to obtain the signals in correspondence of which a recording device is activated in order to produce a coloured composite record.

3. A method according to claim 1, wherein the bi-level recording device directly creates a visible or a latent developable image.

4. A method according to claim 1, wherein the record produced by means of the bi-level recording device comprises a half-tone image of a continuous tone subject and a visually distinct half-tone image of a uniform tone subject, one of such images being superimposed on or at least partly overlapping the other.

5. A method according to claim 1, wherein said bi-level recording device is a bi-level printing device.

6. A method according to claim, wherein said bi-level recording device is a device which image-wise exposes light-sensitive material.

7. Apparatus for producing a composite record from visually distinguishable images, said apparatus comprising a bi-level recording device and comprising means for generating binary signal representations of the images to be recorded, characterised in that the apparatus comprises means which perform logical EXOR operations on the binary signal representations of the different images and which are connected to said recording device to cause activation thereof in dependence on the results of said EXOR operations.

8. Apparatus according to claim 7, wherein said recording device is a device for producing coloured or colour-developable images, said means for generating binary code signals is adapted to generate bit maps of the individual colour-separation records of coloured images to be recorded. and the apparatus comprises means for performing logical EXOR operations on at least one bit map of a colour separation record pertaining to each of the images to be recorded.

* * * * *